(No Model.)
R. KELLS.
CAR WHEEL.
No. 324,705. Patented Aug. 18, 1885.
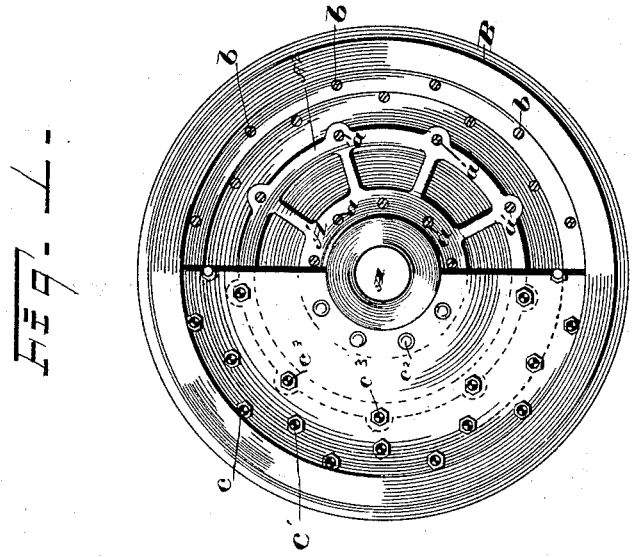
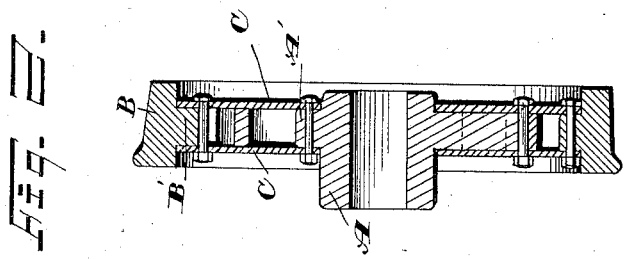
WITNESSES
Wm. N. Monroe
Geo. W. King
INVENTOR
Ross Kells
Leggett & Leggett
Attorneys

UNITED STATES PATENT OFFICE.

ROSS KELLS, OF CLEVELAND, OHIO.

CAR-WHEEL.

SPECIFICATION forming part of Letters Patent No. 324,705, dated August 18, 1885.

Application filed July 3, 1885. (No model.)

*To all whom it may concern:*

Be it known that I, ROSS KELLS, of Cleveland, in the county of Cuyahoga and State of Ohio, have invented certain new and useful Improvements in Car-Wheels; and I do hereby declare the following to be a full, clear, and exact description of the invention, such as will enable others skilled in the art to which it pertains to make and use the same.

My invention relates to improvements in car-wheels in which a steel tire with an internal flange rectangular in cross-section, and located opposite that portion of the tread that covers the rail-head, is secured to the hub by means of steel side plates or disks, the latter being bolted to and embracing an internal flange of the tire and an external flange and a skeleton flange of the hub, the edges of the disk engaging the tire and hub at right angles to the respective planes of the disks, to the end that with such construction a light, strong, durable, and cheap wheel is made, and that a heavy pressure or blow upon the wheel incident to fast running or hard usage has no tendency to separate the side plates or to bring extra strain on the bolts.

With this object in view my invention consists in certain features of construction and in combination of parts hereinafter described, and pointed out in the claims.

In the accompanying drawings, Figure side elevation of my improved car-wheel, a portion of the front disk being broken away to show the internal construction. Fig. 2 is an elevation in section through the center of the wheel.

A represents the hub of the car-wheel, having an external flange, A', and a skeleton flange, A², the latter being integral with the periphery of the flange A'. Both of these flanges have a series of lateral bolt-holes, respectively, $a$ and $a'$.

B is the tire having an internal flange, B', the latter being rectangular in cross-section and located opposite that portion of the tread of the wheel that covers the rail-head. The flange B' is provided with a series of bolt-holes, $b$.

C are steel disks or side plates, the internal and external edges of which are made at right angles to the plane of the respective disks. The flanges A', A², and B' are of the same thickness, so that the disks when in position are parallel and at right angles to the axis of the wheel. The tire and hub are made cylindrical where they respectively engage the edges of the disks, by reason of which there is no tendency of the disks to separate and bring extra strain on the bolts. Outside of the disks the tire internally and the hub externally are respectively a trifle conical, by reason of which the disks are easily placed upon the hub and entered into the tire. The disks are forced home to their respective seats by hydraulic pressure, and are secured in position by bolts, or rivets, if the latter are preferred. The bolt-holes in the disks are of course made to register with the holes in the flanges. The bolts $c$ pass through the holes $b$, but the bolts $c'$ pass just inside the flange B', by which arrangement, if a bolt $c$ should break, the flange would be securely held by the bolts $c'$ on either side of the broken bolt. There are supposed to be enough of the bolts $c$ to hold the tire in case the latter should break, while the bolts $c'$ pass so close to the flange that the heads and nuts of these bolts overlap the line of the flange, and these latter bolts are therefore about as effective as the bolts $c$ in hugging the disks to the flange, and by their location is saved the expense of drilling holes for their passage through the flange, and the consequent weakening of the flange by such holes. The bolts $c^2$ pass through the holes $a$ and secure the disks to the hub. The bolts $c^3$ pass through the holes $a'$ of the skeleton flange, and are about midway in radial distance between the bolts $c$ and $c^2$. These bolts $c^3$ and skeleton flange support the disk in the central part and prevent the latter from buckling or vibrating, but are only considered necessary in the large and medium-sized wheels, and are usually omitted on the small wheels. The space between the disks not occupied by the flanges is left vacant. As nothing further is required in the way of strength or stiffness any filling would be at least useless, and would greatly increase the initial cost of the wheel.

It has been supposed that filling deadened the sound of the wheel, and if it could be applied doubtless would lessen the sharp ring of a cast-iron wheel, or a wheel made in one piece; but it is found that a wheel made of two or more parts will accomplish all that can be done in this direction.

It is believed that with the construction and distribution of material shown better results are attained, and at a less initial cost, than with the car-wheels heretofore in use.

The wheels are well adapted to engine-trucks and to all classes of railway-cars.

What I claim is—

1. In a car-wheel, the combination, with a tire having an internal flange, the latter being rectangular in cross-section and located opposite that portion of the tread that covers the rail-head, a hub having an external flange and a skeleton flange integral with the solid flange, the flanges of the hub and tire corresponding in thickness and lying in the same plane, of side plates or disks bolted to and embracing the said flanges, and joining the tire on lines parallel with the axis of the wheel, substantially as set forth.

2. A car-wheel consisting, essentially, of a steel tire provided with an internal flange rectangular in cross-section and located opposite that portion of the tread that covers the rail-head, a hub having an external solid flange and a skeleton flange, the two flanges being integral and corresponding in thickness, and lying in the same plane with the flanges of the tire, bolts passing respectively through the disks and through the flanges of the hub and tire, a series of bolts passing through the disks next inside the tire-flanges, substantially as set forth.

In testimony whereof I sign this specification, in the presence of two witnesses, this 25th day of June, 1885.

ROSS KELLS.

Witnesses:
CHAS. H. DORER,
ALBERT E. LYNCH.